US012725732B2

(12) United States Patent
Hanashima et al.

(10) Patent No.: US 12,725,732 B2
(45) Date of Patent: Sep. 1, 2026

(54) RARE-EARTH IRON-BASED RING MAGNET AND METHOD FOR MANUFACTURING SAME

(71) Applicant: MINEBEA MITSUMI Inc., Nagano (JP)

(72) Inventors: Kentaro Hanashima, Kitasaku-gun (JP); Haruhiro Komura, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 402 days.

(21) Appl. No.: 18/561,373

(22) PCT Filed: May 16, 2022

(86) PCT No.: PCT/JP2022/020304
§ 371 (c)(1),
(2) Date: Nov. 16, 2023

(87) PCT Pub. No.: WO2022/249908
PCT Pub. Date: Dec. 1, 2022

(65) Prior Publication Data
US 2024/0234028 A1 Jul. 11, 2024

(30) Foreign Application Priority Data
May 24, 2021 (JP) ................................ 2021-086763

(51) Int. Cl.
*H01F 41/02* (2006.01)
*B22F 3/00* (2021.01)
(Continued)

(52) U.S. Cl.
CPC .......... *H01F 41/0253* (2013.01); *B22F 3/004* (2013.01); *B22F 3/14* (2013.01);
(Continued)

(58) Field of Classification Search
None
See application file for complete search history.

(56) References Cited

U.S. PATENT DOCUMENTS 4,836,868 A 6/1989 Yajima et al.
5,100,485 A 3/1992 Yamashita et al.
(Continued)

FOREIGN PATENT DOCUMENTS

CN 103646777 A * 3/2014
JP S64-000703 A 1/1989
(Continued)

OTHER PUBLICATIONS

English translation of the Written Opinion for corresponding International Application No. PCT/JP2022/020304 dated Jul. 26, 2022.
(Continued)

*Primary Examiner* — Seth Dumbris
(74) *Attorney, Agent, or Firm* — Chrisman Gallo Tochtrop LLC

(57) ABSTRACT

A method for manufacturing a rare-earth iron-based ring magnet includes: (a) obtaining a rare-earth iron-based magnet powder; (b) preparing a compound; (c) forming a green body; (d) inserting the green body into a composite mold, setting the composite mold in a spark plasma sintering (SPS) apparatus, and degreasing the green body by energization at a predetermined current density while applying a pressure to the green body under reduced pressure to obtain a degreased body; and (e) sintering the degreased body by energization
(Continued)

at a current density while applying a pressure to the degreased body to obtain a rare-earth iron-based ring magnet.

7 Claims, 4 Drawing Sheets

(51) Int. Cl.

| | |
|---|---|
| ***B22F 3/14*** | (2006.01) |
| ***B22F 3/16*** | (2006.01) |
| ***B22F 3/24*** | (2006.01) |
| ***B22F 5/10*** | (2006.01) |
| ***B22F 9/04*** | (2006.01) |
| ***C22C 38/00*** | (2006.01) |
| ***H01F 1/057*** | (2006.01) |

(52) U.S. Cl.

CPC .................. *B22F 3/16* (2013.01); *B22F 3/24* (2013.01); *B22F 5/106* (2013.01); *B22F 9/04* (2013.01); *C22C 38/005* (2013.01); *H01F 1/057* (2013.01); *B22F 2003/248* (2013.01); *B22F 2009/048* (2013.01); *B22F 2201/02* (2013.01); *B22F 2201/10* (2013.01); *B22F 2301/355* (2013.01); *B22F 2998/10* (2013.01); *B22F 2999/00* (2013.01)

(56) References Cited

U.S. PATENT DOCUMENTS

| | | | | |
|---|---|---|---|---|
| 5,167,915 | A | 12/1992 | Yamashita et al. | |
| 10,770,207 | B2 | 9/2020 | Kume et al. | |
| 2003/0201035 | A1* | 10/2003 | Liu | H01F 1/0577 148/302 |
| 2014/0145808 | A1* | 5/2014 | Kume | B22F 7/04 419/33 |
| 2016/0284452 | A1* | 9/2016 | Horikita | H01F 1/0577 |
| 2019/0221339 | A1* | 7/2019 | Ebe | B22F 3/15 |
| 2020/0357545 | A1 | 11/2020 | Kume et al. | |

FOREIGN PATENT DOCUMENTS

| | | | |
|---|---|---|---|
| JP | H02-198104 | A | 8/1990 |
| JP | H03-284809 | A | 12/1991 |
| JP | 2013-191612 | A | 9/2013 |
| WO | 2018/056390 | A1 | 3/2018 |

OTHER PUBLICATIONS

International Search Report for corresponding International Application No. PCT/JP2022/020304 mailed Jul. 26, 2022.
Written Opinion for corresponding International Application No. PCT/JP2022/020304 dated Jul. 26, 2022.

* cited by examiner

RARE-EARTH IRON-BASED RING MAGNET AND METHOD FOR MANUFACTURING SAME

CROSS REFERENCE TO RELATED APPLICATIONS

This application is a national stage entry of International Application No. PCT/JP2022/020304 filed on May 16, 2022, which claims priority to Japanese Patent Application 2021-086763, filed on May 24, 2021, which is incorporated herein by reference.

TECHNICAL FIELD

The disclosure relates to a rare-earth iron-based ring magnet and a method for manufacturing the same.

BACKGROUND

Conventionally, with miniaturization and performance improvement of devices, rare-earth permanent magnets having high magnetic properties have been used in a wide range of fields such as rotating devices like motors, general household electrical appliances, acoustic devices, on-vehicle devices for automobiles, medical devices, and general industrial devices. As a rare-earth permanent magnet, there is a so-called rare-earth bonded magnet. The rare-earth bonded magnet is a magnet formed by mixing a rare-earth magnet powder and a resin. Although the rare-earth bonded magnet offers a degree of freedom in molding, since a resin being an organic material is used as a binder for binding the rare-earth magnet powder, the rare-earth bonded magnet has low heat resistance and may be difficult to be used in on-vehicle devices subjected to a high-temperature environment.

On the other hand, there has been proposed a method for manufacturing a rare-earth iron-based permanent magnet by bonding rare-earth magnet powders to each other by spark plasma sintering (SPS) without using a resin being an organic material (for example, see JP 02-198104 A and JP 03-284809 A).

In the method for manufacturing a rare-earth iron-based permanent magnet disclosed in JP 02-198104 A and JP 03-284809 A, first, a cavity is filled with a rapidly quenched rare-earth iron-based thin pieces obtained by pulverizing a ribbon containing 13 to 15 atom % of a rare-earth element, 0 to 20 atom % of Co, 4 to 11 atom % of B, and the balance being Fe and inevitable impurities. Next, an assembly of the rapidly quenched rare-earth iron-based thin pieces is compressed at a predetermined pressure under a predetermined reduced pressure, and is subjected to spark plasma sintering. Thus, the rare-earth iron-based permanent magnet can be obtained by bonding the rare-earth iron-based thin pieces without using a resin. The rare-earth iron-based permanent magnet obtained by the methods for manufacturing of JP 02-198104 A and JP 03-284809 A does not use a resin being an organic material as a binder, and therefore has an advantage of high heat resistance compared to a rare-earth bonded magnet.

SUMMARY

However, since the rare-earth iron-based magnet powder obtained by pulverizing the ribbon produced by the rapid quenching method has a flat shape, there is a problem in that a fluidity and a fillability are low when the rare-earth iron-based magnet powder is filled into a cavity.

Accordingly, an object of the disclosure is to provide a method for manufacturing a rare-earth iron-based ring magnet where a fillability in filling a mold with a rare-earth iron-based magnet powder is improved, a productivity is improved, and a rare-earth iron-based ring magnet having an excellent mechanical strength is obtained.

In order to solve the above-mentioned problem and achieve the object, a method for manufacturing a rare-earth iron-based ring magnet according to one aspect of the disclosure includes the steps of: (a) pulverizing a magnetically isotropic rare-earth iron-based magnet ribbon produced by a rapid quenching method to obtain a rare-earth iron-based magnet powder; (b) mixing the rare-earth iron-based magnet powder and polystyrene to prepare a compound; (c) filling a mold with the compound and pressurizing the mixture to form a green body; (d) inserting the green body into a composite mold, setting the composite mold in a spark plasma sintering (SPS) apparatus, and degreasing the green body by heating the green body under reduced pressure by energization at a current density of 250 $A/cm^2$ or more and less than 550 $A/cm^2$ while applying a pressure of 5 MPa or more and 15 MPa or less to the green body to obtain a degreased body; and (e) sintering the degreased body by heating the degreased body under reduced pressure by energization at a current density of 550 $A/cm^2$ or more and 1050 $A/cm^2$ or less while applying a pressure of 15 MPa or more and 200 MPa or less to the degreased body to obtain a rare-earth iron-based ring magnet, wherein the rare-earth iron-based magnet powder includes a rare-earth element in an amount of 13 at % or more and 19 at % or less.

According to one aspect of the disclosure, it is possible to obtain a rare-earth iron-based ring magnet having an improved fillability in filling a mold with a rare-earth iron-based magnet powder, an improved productivity, and an excellent mechanical strength.

DESCRIPTION OF EMBODIMENTS

An embodiment according to the disclosure will be described below in detail with reference to the drawings. Note that the disclosure is not limited to the embodiment. Components in the following embodiment include components easily replaceable by a person skilled in the art or substantially identical components.

Figure 1:
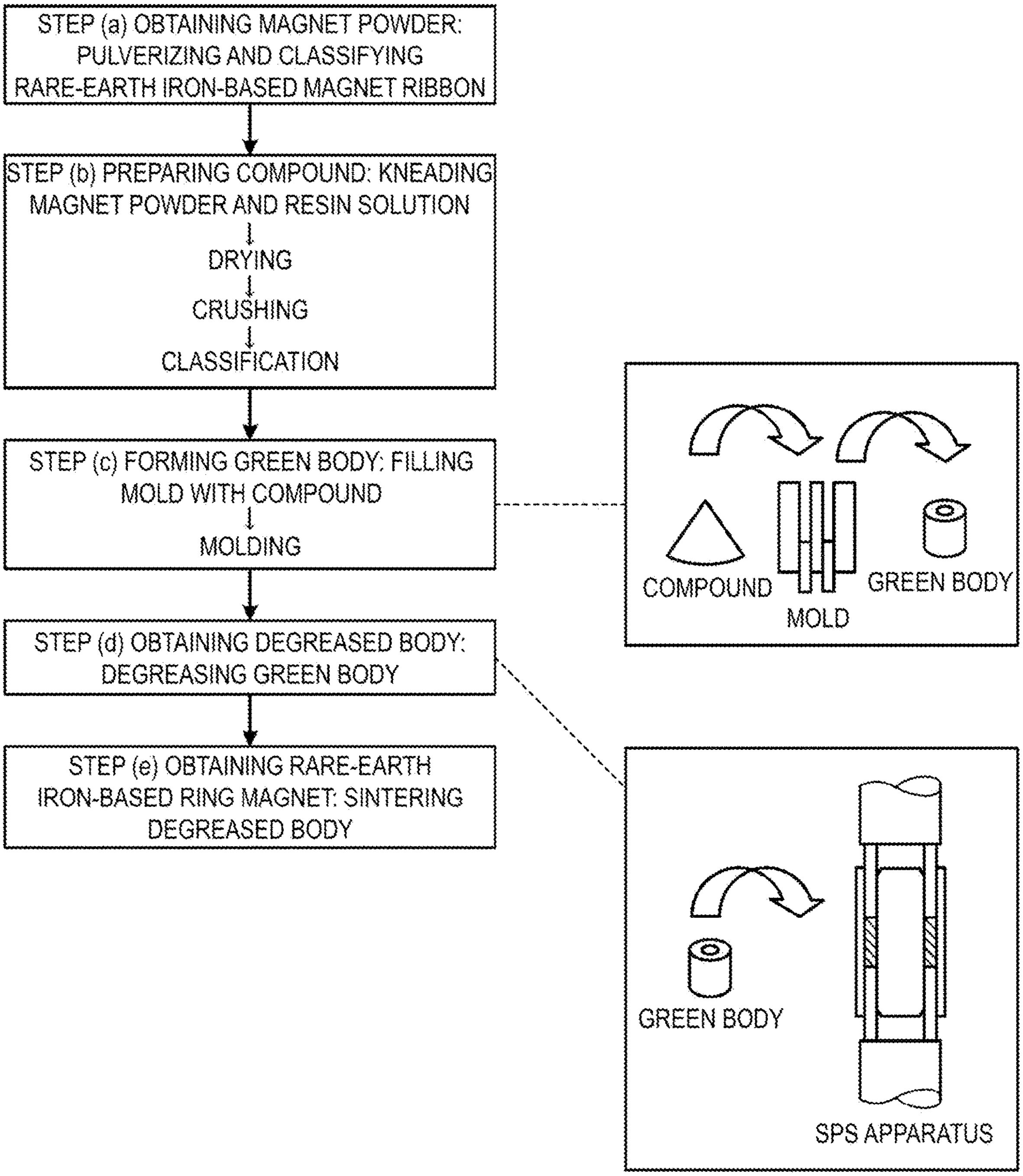
FIG. 1 is a view for specifically describing a method for manufacturing a rare-earth iron-based ring magnet according to an embodiment.

Method for Manufacturing Rare-earth Iron-based Ring Magnet According to Embodiment A method for manufacturing a rare-earth iron-based ring magnet according to the embodiment includes steps (a) to (e) described below. Further, step (f) may be included. FIG. 1 is a view for specifically describing a method for manufacturing the rare-earth iron-based ring magnet according to the embodiment.

In step (a), a magnetically isotropic rare-earth iron-based magnet ribbon produced by a rapid quenching method is pulverized to obtain a rare-earth iron-based magnet powder.

Usually, the rare-earth iron-based magnet ribbon is pulverized and then classified to obtain a rare-earth iron-based magnet powder. The rare-earth iron-based magnet powder produced by the rapid quenching method usually has a flat shape, and is preferably classified into a range of 53 μm or more and 150 μm or less. Note that the obtained rare-earth iron-based magnet powder is also magnetically isotropic. The rare-earth iron-based magnet powder preferably contains at least Nd as a rare-earth element, and is, for example, an Nd—Fe—B-based magnet. The Nd—Fe—B-based magnet includes a $Nd_2Fe_{14}B$-based compound phase being a ternary tetragonal compound as a main phase. The Nd—Fe—B-based magnet usually further includes a rare earth-rich phase (Nd-rich phase) or the like. The Nd—Fe—B-based magnet may be used alone or in combination of two or more kinds. The rare-earth iron-based magnet powder (specifically, the Nd—Fe—B-based magnet) may contain a rare-earth element other than Nd. Examples of the rare-earth element other than Nd include praseodymium (Pr), scandium (Sc), yttrium (Y), lanthanum (La), cerium (Ce), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The rare-earth element other than Nd may be used alone or in combination of two or more kinds. In the Nd—Fe—B based magnet, a part (usually less than 50 atom %) of Fe may be substituted with Co. The Nd—Fe—B-based magnet may contain other elements. Examples of the other elements include titanium (Ti), zirconium (Zr), niobium (Nb), molybdenum (Mo), hafnium (Hf), tantalum (Ta), tungsten (W), copper (Cu), and gallium (Ga). The other elements may be used alone or in combination of two or more kinds. The rare-earth iron-based magnet powder contains a rare-earth element in an amount of 13 at % or more and 19 at % or less. As the amount of the rare-earth element increases, the amount of the rare earth-rich phase also increases. In the method for manufacturing a rare-earth iron-based ring magnet according to the embodiment, a small amount of carbon derived from the polystyrene mixed in step (b) may remain in the obtained rare-earth iron-based ring magnet. However, since the rare-earth iron-based magnet powder having a large amount of the rare earth-rich phase is used, it is possible to suppress the deterioration of the magnetic properties caused by the residual carbon. Specifically, since the original coercive force can be increased as the amount of the rare-earth element is increased, a sufficient coercive force can be maintained even if the coercive force is slightly decreased by the residual carbon. In addition, as the amount of the rare-earth element increases, the influence of the residual carbon on the initial demagnetization and the squareness ratio is similarly suppressed. However, when the amount of the rare-earth element exceeds 19 at %, the magnetization may be excessively decreased or the coercive force may be excessively increased to decrease the magnetization property. On the other hand, when the amount of the rare-earth element is less than 13 at %, the magnetic properties may deteriorate during sintering. In addition, the suppression of the deterioration of the magnetic properties due to the residual carbon may be insufficient. The rare-earth iron-based magnet powder preferably has a coercive force of 1500 kA/m or more.

In step (b), the rare-earth iron-based magnet powder and polystyrene are mixed to prepare a compound. Since polystyrene does not contain oxygen atoms, the magnetic properties of the obtained rare-earth iron-based ring magnet are unlikely to deteriorate. In step (b), specifically, polystyrene is dissolved in an organic solvent to prepare a resin solution. Here, the organic solvent may be a solvent capable of dissolving polystyrene and capable of being evaporated during drying described below. For the organic solvent, methyl ethyl ketone is suitably used. The rare-earth iron-based magnet powder and the resin solution are kneaded. Next, the kneaded product obtained by kneading is dried to evaporate the organic solvent, and then the kneaded product is crushed. The crushed material obtained by crushing is classified to obtain a compound. In step (b), the polystyrene is preferably mixed in an amount of 2 wt % or less, more preferably in an amount of 1 wt % or more and 2 wt % or less with respect to 100 wt % of the rare-earth iron-based magnet powder. When the amount exceeds 2 wt %, carbides are formed in step (e), and the amount of residual carbon in the rare-earth iron-based ring magnet is increased. This may excessively deteriorate the magnetic properties. In addition, when the amount is less than 1 wt %, the improvement of the fillability in step (c) may be insufficient. The compound is preferably classified into a range of 125 μm or less. Further, the compound is more preferably classified into a range of 20 μm or more and 125 μm or less. When the classification is performed within the above range, the fillability in step (c) can be further improved. In addition, the mechanical strength of the obtained rare-earth iron-based ring magnet can also be improved.

In step (c), the compound is filled in a mold and pressurized to form a green body. The fluidity of the compound is higher than a fluidity of the magnet powder alone used for preparing the compound. Therefore, the compound is quickly filled into the mold. That is, the fillability can be improved by compounding. Since the filling time can be shortened, the productivity of the rare-earth iron-based ring magnet can also be improved. Further, it is possible to suppress damage to the mold caused by the magnetic powder. During compression molding in step (c), it is preferable to apply a pressure of 200 MPa or more and 1000 MPa or less to the mold containing the compound. This results in a green body with intimate contact between the particles of the compound. The compression molding in step (c) is usually carried out at room temperature. The mold is made of a material capable of withstanding the pressure range described above. Note that since the composite mold used in steps (d) and (e) is for spark plasma sintering (SPS), it may be deformed or broken unless the pressure is lower than the above-mentioned pressure range. The shape and size of the mold can be appropriately determined so as to obtain a molded body with a preferable shape (ring shape) and size, in consideration of the shape and size of the rare-earth iron-based ring magnet desired to be finally produced. For example, if the dimension and weight of the molded body are determined in advance based on the specifications of the finished product, it is possible to eliminate the need for processing. That is, it is possible to manufacture a net-shaped rare-earth iron-based ring magnet. The size of the molded body obtained in step (c) is preferably slightly smaller than the dimension of the composite mold used in steps (d) and (e). As a result, there is an advantage in that charging into the composite mold becomes easy. When a thin rare-earth iron-based ring magnet having a thickness of, for example, 0.8 mm or more and 2.5 mm or less is finally produced, it is necessary to thinly fill the mold with the compound also in step (c). Even in this case, in the present embodiment, an excellent fillability can be achieved because it is compounded in advance. On the other hand, when the magnet powder is used alone, it is necessary to fill the magnet powder more carefully over a long period of time, causing troublesomeness.

In step (d), the green body is inserted into a composite mold, and the composite mold is set in a spark plasma sintering (SPS) apparatus. Next, the green body is degreased by heating the green body under reduced pressure by energization at a current density of 250 A/cm$^2$ or more and less than 550 A/cm$^2$ while applying a pressure of 5 MPa or more and 15 MPa or less to the green body to obtain a degreased body. Note that specifically, ON-OFF direct current pulse energization is performed for the green body.

For the composite mold, a composite mold (warm forming mold) with ceramics and cemented carbide being combined is suitably used. The heating during the degreasing is preferably performed under a reduced pressure of 10-3 Pa or more and 101 Pa or less. In addition, it is preferable to apply a pressure in the above range to the green body for energization. Furthermore, when the green body is energized at a current density within the above range, the green body can be heated from room temperature to a temperature where polystyrene decomposes (specifically, a temperature of 350° C. or more and 400° C. or less), and degreasing can be suitably performed.

In step (e), the degreased body is sintered by heating the degreased body under reduced pressure by energization at a current density of 550 A/cm$^2$ or more and 1050 A/cm$^2$ or less while applying a pressure of 15 MPa or more and 200 MPa or less to the degreased body to obtain a rare-earth iron-based ring magnet (bulk body). Step (e) can be carried out directly after step (d) using the spark plasma sintering (SPS) apparatus. Note that specifically, ON-OFF direct current pulse energization continues to be performed for the degreased body.

The heating during the sintering is preferably performed under a reduced pressure of $10^{-3}$ Pa or more and 101 Pa or less. For efficient densification, it is preferable to apply a pressure in the above range to the degreased body. Furthermore, when the degreased body is energized at a current density within the above range, the degreased body can be heated from the degreasing temperature to a temperature where sintering progresses (specifically, an attainment temperature where the Nd—Fe—B-based magnet can form a liquid phase, for example, an attainment temperature of 600° ° C. or more and 750° C. or less), and sintering can be suitably performed. In order to suppress the growth of the crystal grains, it is desirable to terminate the sintering with the holding time at the attainment temperature being five minutes or less. Further, it is more preferable that the sintering is terminated without maintaining the heating temperature when the rate of change becomes 0. Here, the rate of change is obtained by time-differentiating a displacement (e.g., a moving distance of a punch) during sintering.

In the present embodiment, since degreasing and spark plasma sintering (SPS) are performed after the molded body is formed in advance, filling of the magnetic powder into the composite mold is simple. In addition, since degreasing and spark plasma sintering (SPS) are performed after the molded body is formed in advance, heating efficiency is improved, sintering time can be shortened, and sintering temperature can be lowered. As a result, in the obtained rare-earth iron-based ring magnet, it is possible to suppress a decrease in magnetic properties such as a coercive force and squareness. In addition, when spark plasma sintering (SPS) is performed using the magnet powder as is as in conventional practice, an irregular current path may occur due to the density of the magnet powder. As a result, local coarse grains may be generated, and the magnetic properties may vary, for example, initial demagnetization may decrease. On the other hand, in the present embodiment, since degreasing and spark plasma sintering (SPS) are performed after the molded body is formed in advance, the magnetic properties are less likely to vary, and the quality can be improved. In addition, since degreasing and spark plasma sintering (SPS) are performed after the molded body is formed in advance, the height of the mold and the height in the chamber of the sintering apparatus can be minimized. Further, in the present embodiment, the rare-earth iron-based ring magnet can be easily removed from the die. The same applies to a rare-earth iron-based ring magnet having a small thickness. It is considered that this is because carbon released from the green body during degreasing in step (d) plays a role of a mold release agent. The composite mold may be subjected to a mold release treatment before insertion of the green body, but the amount of the mold release agent can be reduced because the mold removal is easy as described above. In addition, since the mold can be easily removed as described above, the mold is hardly stained and the time and labor for cleaning can be reduced, and as a result, the life of the mold is also improved. Note that since the green body has a ring shape, carbon is easily removed during degreasing as compared with a cylindrical shape, and the amount of residual carbon in the rare-earth iron-based ring magnet can be reduced.

In the present embodiment, it is considered that the carbon content in the rare-earth iron-based ring magnet can be sufficiently reduced by performing densification after completion of degreasing, and thus the mechanical strength can be improved.

The rare-earth iron-based ring magnet obtained in step (e) is usually cooled to room temperature or a temperature range where the rare-earth iron-based ring magnet can be taken out. The cooling may be performed while applying a pressure, or may be performed under atmospheric pressure or under reduced pressure by an inert gas, but is preferably performed as follows. That is, the method for manufacturing a rare-earth iron-based ring magnet according to the embodiment preferably further includes step (f) of cooling the rare-earth iron-based ring magnet in an inert gas atmosphere while gradually reducing the pressure applied to the rare-earth iron-based ring magnet obtained by sintering in step (e) and the current density applied to the rare-earth iron-based ring magnet. Here, "gradually decreasing" the pressure includes a case where the pressure is decreased continuously and a case where the pressure is decreased stepwise. Further, "gradually decreasing" the current density includes a case where the current density is decreased continuously and a case where the current density is decreased stepwise. After that, the rare-earth iron-based ring magnet is removed from the mold usually at room temperature or in a removable temperature range.

Examples of the inert gas atmosphere include an $N_2$ gas atmosphere and an Ar gas atmosphere. Specifically, when cooling is performed while flowing an inert gas inside and outside the mold, the cooling time can be shortened. Further, it is preferable to gradually reduce the pressure applied in step (e) until the pressure reaches 0 MPa, for example over three minutes or more and five minutes or less. In addition, the current density applied in step (e) is preferably gradually reduced to 0 A/cm$^2$, for example, over three minutes or more and five minutes or less. When the cooling is gradually performed in the inert gas atmosphere, the growth of the crystal grains of the magnet powder due to the thermal history in the high temperature region is suppressed, and the oxidation is also suppressed. As a result, the magnetic properties can be improved. Further, a magnetization step of magnetizing the obtained rare-earth iron-based ring magnet may be performed. The magnetization step can be performed by a known method. Note that if necessary, a surface treatment step of subjecting the obtained rare-earth iron-based ring magnet to a surface treatment (rust prevention treatment) may be performed, and then a magnetization step of magnetizing the surface-treated rare-earth iron-based ring magnet may be performed. In the surface treatment step, surface treatment such as plating treatment with nickel (Ni), tin (Sn), zinc (Zn), or the like, aluminum (Al) vapor deposition, and resin coating is performed.

Furthermore, step (b) may be a step of mixing the rare-earth iron-based magnet powder, polystyrene, and a lubricant to prepare a compound. Specifically, in step (b), the lubricant may be mixed in an amount of 0.2 wt % or less with respect to a total of 100 wt % of the rare-earth iron-based magnet powder and polystyrene. The lubricant is more preferably mixed in an amount of 0.05 wt % or more and 0.2 wt % or less with respect to the total of 100 wt % of the rare-earth iron-based magnet powder and the polystyrene. When a lubricant is used, the fillability in step (c) can be further improved. When the amount exceeds 0.2 wt %, carbides are formed in step (e), and the amount of residual carbon in the rare-earth iron-based ring magnet is increased. This may cause deterioration of magnetic properties and deterioration in strength. When the amount is less than 0.05 wt %, further improvement of the fillability in step (c) may be insufficient.

Specifically, the lubricant is mixed after the classification in step (b) of FIG. 1. That is, a lubricant is further mixed with the classified compound. In this case, in step (c), the compound mixed with the lubricant is filled in a mold and pressurized to form a green body. For the lubricant, calcium stearate is suitably used.

Rare-Earth Iron-Based Ring Magnet According to Embodiment

The rare-earth iron-based ring magnet according to the embodiment is a rare-earth iron-based ring magnet obtained by spark plasma sintering of a rare-earth iron-based magnet powder, wherein the rare-earth iron-based magnet powder is a magnetically isotropic rapidly quenched powder, contains a rare-earth element in an amount of 13 at % or more to 19 at % or less, and has a coercive force of 1500 kA/m or more. Further, and the rare-earth iron-based ring magnet has a radial crushing strength of 100 MPa or more and an initial demagnetization rate of less than 10%. Preferably, the rare-earth iron-based ring magnet has a carbon content of 2000 ppm or less and an average crystal grain size of less than 200 nm. Here, the average crystal grain size is an average value of individual crystal grain sizes obtained from an image obtained by observing a magnet structure with SEM or TEM.

The rare-earth iron-based magnet powder preferably contains at least Nd as the rare-earth element. Details of the rare-earth iron-based magnet powder are the same as the details described in the method for manufacturing a rare-earth iron-based ring magnet according to the embodiment.

The rare-earth iron-based ring magnet according to the embodiment has excellent magnetic properties because the amount of carbon contained is reduced. It also has excellent mechanical strength.

The rare-earth iron-based ring magnet according to the embodiment may be thin, and has a thickness of, for example, a range of 0.8 mm to 2.5 mm. The thinner the thickness is, the easier the degreasing is. In addition, the outer diameter is, for example, in a range from 10 mm to 50 mm. The rare-earth iron-based ring magnet according to the embodiment has a coercive force of, for example, 1200 kA/m or more and 1800 kA/m or less.

Such a rare-earth iron-based ring magnet is obtained by, for example, the method for manufacturing a rare-earth iron-based ring magnet according to the above-described embodiment.

JP 2013-191612 A proposes a method for manufacturing a rare-earth permanent magnet by mixing a pulverized magnet powder with a binder to produce a compound, molding the produced compound into a sheet to produce a green sheet, calcining the green sheet at a binder decomposition temperature, and subjecting the green sheet to spark plasma sintering (SPS).

The rare-earth permanent magnet disclosed in JP 2013-191612 A is the Nd—Fe—B-based anisotropic magnet powder composed of 27 to 40 wt % of Nd, 0.8 to 2 wt % of B, and 60 to 70 wt % of Fe. Then, a binder is mixed with the magnet powder to prepare a compound. For the amount of the binder added, the ratio of the binder to the total amount of the magnet powder and the binder is 1 wt % to 40 wt %, more preferably 2 wt % to 30 wt %, and even more preferably 3 wt % to 20 wt %. Subsequently, the compound is formed into a sheet to form a green sheet, the green sheet is heated to a temperature equal to or higher than the glass transition point or the melting point of the binder to soften the green sheet, a magnetic field is applied to perform magnetic field orientation, and the easy axis of magnetization of the magnet included in the green sheet is oriented in a predetermined direction. Then, the magnetic field-oriented green sheet is punched into a desired shape to form a molded body. Subsequently, the molded body is calcined in a non-oxidizing atmosphere (for example, a hydrogen atmosphere or a mixed gas atmosphere of hydrogen and an inert gas) to decompose and degrease the binder. The calcined molded body is subjected to spark plasma sintering (SPS) to obtain a rare-earth permanent magnet.

In the method for manufacturing rare-earth permanent magnets disclosed in JP 2013-191612 A, the molded green sheet is subjected to magnetic field orientation to orient the easy axis of magnetization of the magnet contained in the green sheet in a predetermined direction, so that the ratio of the binder is high (more preferably 3 wt % to 20 wt %). Therefore, the degreasing treatment step of decomposing the binder takes time.

A green sheet subjected to magnetic field orientation is punched into a desired shape to form a molded body. The molded body is subjected to a calcination treatment in a non-oxidizing atmosphere (for example, a hydrogen atmosphere or a mixed gas atmosphere of hydrogen and an inert gas) to decompose and degrease the binder, but it is necessary to perform the calcination treatment in a hydrogen atmosphere or a mixed gas atmosphere of hydrogen and an inert gas.

Note that the magnetic powder disclosed in JP 2013-191612 A is an anisotropic magnet, and an ingot of a magnet alloy is coarsely pulverized by a stamp mill, a crusher, or the like. Alternatively, a coarsely pulverized magnet powder is obtained by melting an ingot, preparing flakes by a strip casting method, and coarsely pulverizing the flakes by a hydrogen decrepitation method. On the other hand, in the present embodiment, since the magnetically isotropic rapidly quenched powder produced by the rapid quenching method is used as the magnet powder, both the magnets produced by the spark plasma sintering (SPS) have different average crystal grain sizes. Since the magnetic powder disclosed in JP 2013-191612 A is produced by melting an ingot and forming flakes by a strip casting method, the cooling rate is lower than the cooling rate of the rapidly quenched powder, so that the average crystal grain size of the magnetic powder becomes large, and as a result, the average crystal grain size of the magnet produced by spark plasma sintering (SPS) also becomes large.

The disclosure is not limited by the embodiment described above. A configuration obtained by appropriately combining the above-mentioned constituents is also included in the disclosure. Further effects and modification examples can be easily derived by a person skilled in the art. Thus, a wide range of aspects of the disclosure are not limited to the above embodiment and various changes can be made.

EXAMPLES

Example 1

The molded green body was inserted into a mold, and a degreasing step and a sintering step were continuously performed. At this time, the influence of the degreasing step was evaluated based on Samples 1 and 2.

Sample 1

The Nd—Fe—B-based magnet powder (amount of rare-earth element: 13.8 at %; coercive force: 1500 kA/m or more; rapidly quenched powder) was pulverized using a free pulverizer (model M-2, manufactured by Nara Machinery Co., Ltd.) and classified into a range of 53 μm to 150 μm. A 4 g of polystyrene previously dissolved in 20 g of methyl ethyl ketone (MEK) was added to 200 g of the classified magnet powder, and the mixture was kneaded for 15 minutes in a laboratory mill while exhausting air in a draft chamber to obtain a kneaded product.

The kneaded product was placed in an oven heated to 80° C. and dried for 30 minutes to volatilize MEK. The powder obtained by volatilizing MEK was crushed in a mortar and classified to 20 μm to 125 μm or less with a dry sieve to obtain a compound.

Next, a ring-shaped mold having an outer diameter of 13 mm and an inner diameter of 11 mm was filled with the above compound, and powder compression molding was performed by applying a pressure of 300 MPa to form a ring-shaped green body.

The molded green body was inserted into a composite mold with ceramics and cemented carbide having been combined, and degreasing was performed under reduced pressure while evacuating to about $10^{-3}$ Torr with a rotary pump in a spark plasma sintering (SPS) apparatus. Specifically, while applying a pressure of 10 MPa, a current density of 400 A/$cm^2$ was applied and held for a predetermined time to perform degreasing.

Subsequently, sintering was continuously carried out by applying a current density of 800 A/$cm^2$ and increasing the temperature to about 700° C. applying a pressure of 120 MPa.

After completion of sintering, the pressure and current were immediately shut off, $N_2$ gas was introduced into the chamber, and the chamber was cooled under atmospheric pressure (After completion of sintering, the pressure was immediately set to 0 MPa, the current density was set to 0 A/$cm^2$, $N_2$ gas was introduced into the chamber, and cooling was performed under atmospheric pressure). After cooling to a predetermined temperature, releasing was performed to obtain a rare-earth iron-based ring magnet.

Four samples 1, No. 1 to No. 4 were prepared.

Sample 2

A ring-shaped green body was molded in the same manner as in Sample 1.

The molded green body was inserted into a composite mold with ceramics and cemented carbide having been combined, and pulse electric sintering was performed under reduced pressure while evacuating to about 10-3 Torr with a rotary pump in a spark plasma sintering (SPS) apparatus. To be specific, degreasing and sintering were continuously performed by applying a current density of 800 A/$cm^2$ and increasing the temperature from room temperature to about 700° C. while applying a pressure of 120 MPa.

After completion of sintering, the current was shut off, $N_2$ gas was introduced into the chamber, and the chamber was cooled under atmospheric pressure (After completion of sintering, the pressure was immediately set to 0 MPa, the current density was set to 0 A/$cm^2$, $N_2$ gas was introduced into the chamber, and cooling was performed under atmospheric pressure). After cooling to a predetermined temperature, releasing was performed to obtain a rare-earth iron-based ring magnet. Four samples 2, No. 1 to No. 4 were prepared.

Figure 2:
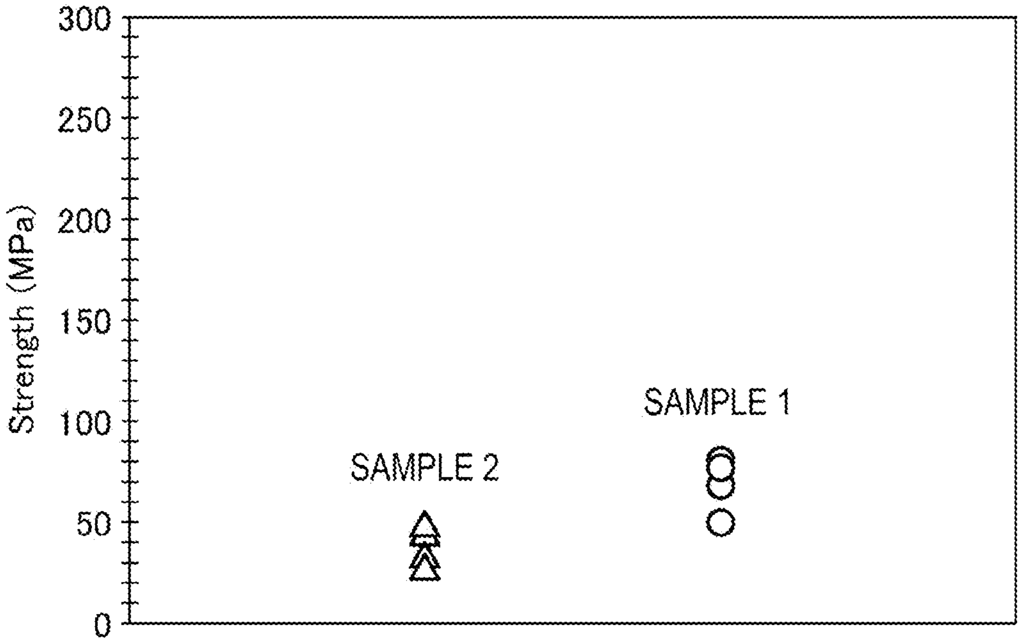
FIG. 2 is a view showing a measurement result of a radial crushing strength of Samples 1 and 2.

Table 1 shows a measurement result of a radial crushing strength of Samples 1 and 2. FIG. 2 is a view showing a measurement result of a radial crushing strength of Samples 1 and 2. As shown in FIG. 2, the radial crushing strength of Sample 2 is lower than the radial crushing strength of the sample 1. From the results of the radial crushing strength, it is presumed that in Sample 2, since the degreasing stage was insufficient, a residue of the binder remained inside and the mechanical strength was reduced.

TABLE 1

| | | Radial crushing strength (MPa) |
|---|---|---|
| Sample 1 | No. 1 | 68.71 |
| | No. 2 | 80.84 |
| | No. 3 | 78.24 |
| | No. 4 | 49.56 |
| Sample 2 | No. 1 | 31.78 |
| | No. 2 | 48.90 |
| | No. 3 | 30.26 |
| | No. 4 | 26.81 |

Example 2

From the results of the effect of degreasing in Example 1, it can be seen that the radial crushing strength can be improved by performing degreasing under the conditions of Sample 1. Therefore, in the case where the degreasing step and the sintering step were performed for Sample 1, the relationship between the conditions in the cooling step after sintering and the initial demagnetization was examined.

Sample 3

The sintering step was carried out in the same manner as in Sample 1.

After completion of sintering, $N_2$ gas was introduced into the chamber, and cooling was carried out under atmospheric pressure by lowering the current density stepwise to 0 A/$cm^2$ and lowering the pressure stepwise from 120 MPa to 0 MPa over about 180 seconds without immediately interrupting the current.

After cooling to a predetermined temperature, releasing was performed to obtain a rare-earth iron-based ring magnet.

Four samples 3, No. 1 to No. 4 were prepared.

Sample 4

The sintering step was carried out in the same manner as in Sample 1.

After completion of sintering, cooling was carried out by lowering the current density stepwise to 0 A/cm$^2$ and lowering the pressure stepwise from 120 MPa to 0 MPa over about 180 seconds without immediately interrupting the current while flowing $N_2$ gas inside and outside the composite mold. After cooling to a predetermined temperature, releasing was performed to obtain a rare-earth iron-based ring magnet.

Four samples 4, No. 1 to No. 4 were prepared.

Figure 3:
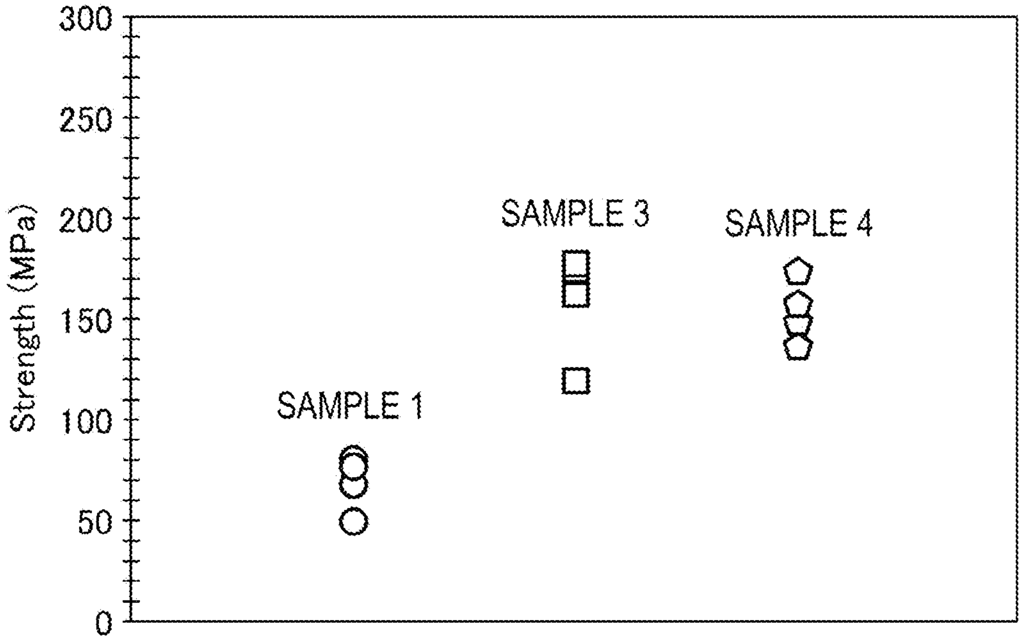
FIG. 3 is a view showing a measurement result of a radial crushing strength of Samples 1, 3, and 4.
Figure 4:
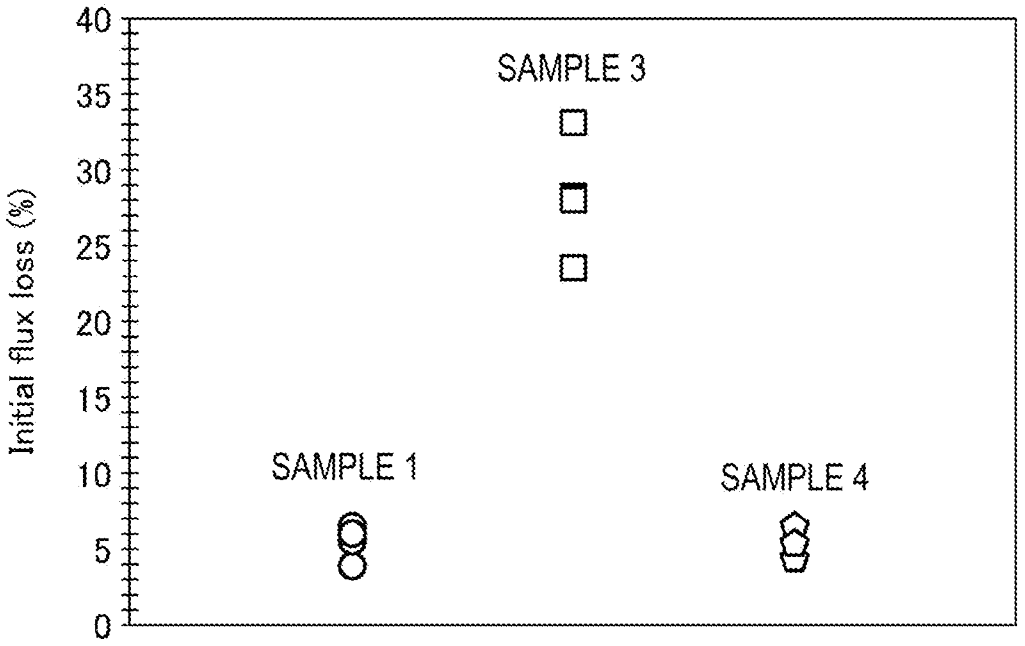
FIG. 4 is a view showing a measurement result of an initial demagnetization rate of Samples 1, 3, and 4.

Table 2 shows a measurement result of a radial crushing strength and initial demagnetization rate of Samples 1, 3, and 4. FIG. 3 is a view showing a measurement result of a radial crushing strength of Samples 1, 3, and 4. FIG. 4 is a view showing a measurement result of an initial demagnetization rate of Samples 1, 3, and 4. As shown in FIG. 3, the radial crushing strengths of Samples 3 and 4 are higher than the radial crushing strength of Sample 1. From the results of the radial crushing strength, it can be seen that, in the cooling step after sintering, the decrease in radial crushing strength can be suppressed by reducing the applied current stepwise for a predetermined time without interrupting the current application immediately after sintering. It is presumed that this is because when the applied current is interrupted immediately after sintering, the temperature of the mold is rapidly lowered, so that distortion occurs in the material to be sintered due to thermal shock or temperature distribution.

On the other hand, referring to the value of the initial demagnetization rate, the radial crushing strengths of Samples 3 and 4 were substantially equal to each other, but the initial demagnetization rate of Sample 4 was significantly smaller than the initial demagnetization rate of Sample 3. In Sample 3, the applied current was decreased stepwise after sintering, but $N_2$ gas was not supplied unlike in Sample 4. Thus, it is presumed that the crystal grains of the magnet powder grew due to the history in the high temperature region for a short period of time, resulting in a decrease in the coercive force. According to Sample 4, it is found that a rare-earth iron-based ring magnet having a large radial crushing strength and a small initial demagnetization rate can be obtained.

TABLE 2

| | | Radial crushing strength (MPa) | Initial demagnetization rate (%) at 200° C. |
|---|---|---|---|
| Sample 1 | No. 1 | 68.71 | 3.76 |
| | No. 2 | 80.84 | 6.54 |
| | No. 3 | 78.24 | 5.97 |
| | No. 4 | 49.56 | 5.43 |
| Sample 3 | No. 1 | 174.56 | 23.51 |
| | No. 2 | 177.34 | 28.29 |
| | No. 3 | 162.20 | 28.08 |
| | No. 4 | 118.86 | 33.12 |
| Sample 4 | No. 1 | 153.36 | 6.40 |
| | No. 2 | 136.39 | 4.31 |
| | No. 3 | 148.24 | 4.35 |
| | No. 4 | 173.08 | 5.22 |

Evaluation of Mechanical Strength and Evaluation of Magnetic Properties

As for the mechanical strength, radial crushing strength was determined by measurement according to JIS Z 2507. As for the magnetic properties, the initial demagnetization rate was determined. The initial demagnetization rate was evaluated by exposing the obtained rare-earth iron-based ring magnet to high-temperature heat (200° ° C., 1 hour), measuring the magnetic flux density at room temperature, and calculating the rate of change before and after the heat exposure.

Carbon Content and Average Crystal Grain Size

The carbon content and the average crystal grain size were measured for the rare-earth iron-based ring magnets (Samples 1 to 4) obtained in Examples. In all of the rare-earth iron-based ring magnets, the carbon content was equal to or less than 2000 ppm, and the average crystal grain size was less than 200 nm. Note that the carbon content was measured by a combustion method using a CS analyzer.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A rare-earth iron-based ring magnet obtained by spark plasma sintering of a rare-earth iron-based magnet powder, wherein the rare-earth iron-based magnet powder is a magnetically isotropic rapidly quenched powder, includes a rare-earth element in an amount of 13 at % or more and 19 at % or less, and has a coercive force of 1500 kA/m or more, the rare-earth iron-based ring magnet has a radial crushing strength of 100 MPa or more and an initial demagnetization rate of less than 10%, and the rare-earth iron-based ring magnet has a carbon content of 2000 ppm or less and an average crystal grain size of less than 200 nm.

2. The rare-earth iron-based ring magnet according to claim 1, wherein the rare-earth iron-based magnet powder includes at least Nd as the rare-earth element.

3. A method for manufacturing a rare-earth iron-based ring magnet, the method comprising:

(a) pulverizing a magnetically isotropic rare-earth iron-based magnet ribbon produced by a rapid quenching method to obtain a rare-earth iron-based magnet powder;

(b) mixing the rare-earth iron-based magnet powder and polystyrene to prepare a compound, and classifying the compound into a range of 20 μm or more and 125 μm or less;

(c) filling a mold with the compound and pressurizing the mixture to form a green body;

(d) inserting the green body into a composite mold, setting the composite mold in a spark plasma sintering (SPS) apparatus, and degreasing the green body by heating the green body under reduced pressure by energization at a current density of 250 A/cm$^2$ or more and less than 550 A/cm$^2$ while applying a pressure of 5 MPa or more and 15 MPa or less to the green body to obtain a degreased body; and (e) sintering the degreased body by heating the degreased body under reduced pressure by energization at a current density of 550 A/cm$^2$ or more and 1050 A/cm$^2$ or less while applying a pressure of 15 MPa or more and 200 MPa or less to the degreased body to obtain a rare-earth iron-based ring magnet, wherein the rare-earth iron-based magnet powder includes a rare-earth element in an amount of 13 at % or more and 19 at % or less.

4. The method for manufacturing a rare-earth iron-based ring magnet according to claim 3, further comprising (f) cooling the rare-earth iron-based ring magnet in an inert gas atmosphere while gradually reducing the pressure applied to the rare-earth iron-based ring magnet obtained by sintering and the current density applied to the rare-earth iron-based ring magnet.

5. The method for manufacturing a rare-earth iron-based ring magnet according to claim 3, wherein the rare-earth iron-based magnet powder includes at least Nd as the rare-earth element.

6. The method for manufacturing a rare-earth iron-based ring magnet according to claim 3, wherein in step (b), the polystyrene is mixed in an amount of 2 wt % or less with respect to 100 wt % of the rare-earth iron-based magnet powder.

7. The method for manufacturing a rare-earth iron-based ring magnet according to claim 3, wherein step (b) is mixing the rare-earth iron-based magnet powder, the polystyrene, and a lubricant to prepare a compound, and in step (b), the lubricant is mixed in an amount of 0.2 wt % or less with respect to a total of 100 wt % of the rare-earth iron-based magnet powder and the polystyrene.

* * * * *